United States Patent
Rast

(10) Patent No.: US 6,621,969 B1
(45) Date of Patent: Sep. 16, 2003

(54) CONTINUOUSLY VARIABLE FIBER OPTIC DELAY LINE USING COMPRESSIBLE MEDIA

(75) Inventor: Howard E. Rast, Solana Beach, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 200 days.

(21) Appl. No.: 09/735,307

(22) Filed: Jun. 9, 2000

(51) Int. Cl.[7] .................................................. G02B 6/02
(52) U.S. Cl. ........................ 385/123; 385/124; 385/141; 385/144
(58) Field of Search ................................. 385/123, 124, 385/126, 127, 128, 141, 144, 145

(56) References Cited

U.S. PATENT DOCUMENTS

| | | |
|---|---|---|
| 4,181,403 A | 1/1980 | Macedo et al. |
| 4,468,091 A | 8/1984 | Schmadel et al. |
| 4,770,492 A | 9/1988 | Levin et al. |
| 4,877,304 A | 10/1989 | Bhagavatula |
| 5,416,863 A | 5/1995 | Vengsarkar |
| 5,530,778 A | 6/1996 | Rast |
| 5,911,025 A * | 6/1999 | Garito et al. ................ 385/127 |

FOREIGN PATENT DOCUMENTS

JP 01295206 A * 11/1989

* cited by examiner

Primary Examiner—Rodney Bovernick
Assistant Examiner—Sung Pak
(74) Attorney, Agent, or Firm—Peter A. Lipovsky; Michael A. Kagan; James A. Ward

(57) ABSTRACT

A continuously variable fiber-optic delay line is created from a deformable polymeric fiber in which lighter density elements, e.g. hydrogen, boron, carbon or oxygen, are diffused through the outer surface of the fiber. The diffusion of the lighter elements creates a non-light transmissive cladding that is of a refractive index that increases from the surface of the fiber towards its axis. The cladding longitudinally surrounds a light transmissive core and has a maximum refractive index that is less than any refractive index of the core. A single-mode, graded-index polymeric fiber is thereby created. By applying a reversible and controllable pressure to the exterior of the deformable fiber, the refractive index of the fiber can be changed accordingly. This change in refractive index permits one to continuously vary the time delay of a signal transmitted through a fixed length of the fiber.

4 Claims, 1 Drawing Sheet

CONTINUOUSLY VARIABLE FIBER OPTIC DELAY LINE USING COMPRESSIBLE MEDIA

BACKGROUND OF THE INVENTION

This invention relates generally to time delay mechanisms and more particularly to the delay associated with the elapsed time of an optical transmission. In greater particularity, the invention pertains to using a compressible fiber optic line to provide a continuously variable delay of an optical transmission.

Time delays have many uses. In both military and commercial sectors, time delay components are used, for example, in phased array antennas, direction finding arrays, and moving target indicators and simulators. Time delay components are useful in applications requiring phase matching or the comparison of waveforms, pulse trains, and electrical or optical signals over the course of time. For example, in an application in which a train of very short-duration optical pulses are transmitted to and returned from a distant mirror and are compared, one may wish to superimpose the returned signals on the original signals to compare the fidelity of the returned pulse or to infer some property from the transmission medium or the conditions existing at the remote location of the mirror. One may accomplish this by using a beam splitter to split the original pulse into two parts, one of which is transmitted to the distant mirror and one which is delayed in time to coincide with the arrival of the returned transmitted signal.

To date a fixed length of optical fiber has been used in some scenarios to accomplish such delays. These fiber optic delay lines consist of a length of optical fiber in which a short duration pulse is launched. The delay is effected by the time it takes the pulse to travel the length of the fiber and return. Since the fibers length is fixed, the time delay is the product of twice the length divided by the index of refraction of the fiber's material at the-spectral wavelength of the optical signal.

The waveguiding properties of optical fibers arise from their material composition and configuration. Typically, such materials are silica-based, that is, a glass material based on silicon dioxide doped appropriately with heavier elements in the "core" to provide the necessary waveguide properties for this transmission medium. Normally, the fibers are cylindrical with a denser material in the center or "core" region of the fiber.

Viewed from the perspective of geometrical optics, a light wave launched into one end of the fiber will be subject to multiple internal reflections if the launch angle is less than the "critical" angle determined from Snell's Law of Refraction. Those rays which then transmit the fiber in a plane containing the central axis of the optical fiber are referred to as meridonal rays, whereas those rays which exceed the critical angle are lost in the "cladding". The cladding is a material having an index of refraction that is less than that of the core and, thus, forms the boundary for creating the critical angle of refraction and the total internal reflection causing waveguiding.

In prior methods, the use of a fixed length of optical fiber gave only a single time delay associated with the round-trip transit time of an optical signal. If, for a fixed length of optical fiber, the refractive index of the fiber could be changed for a fixed wavelength of light, then because of the dispersive properties of the medium of transmission, the transit time could also be changed. In U.S. Pat. No. 5,530, 778, the inventor described a method and apparatus of altering wavelength in the region of a fiber's anomalous dispersion to effect continuously variable time delays. In the present invention, a mechanical means is used to change the core-cladding index of a fiber in a continuous and predictable manner to achieve desired variable time delays.

SUMMARY OF THE INVENTION

A continuously variable fiber-optic delay line is created from a deformable polymeric fiber in which lighter density elements, e.g. hydrogen, boron, carbon or oxygen, are diffused through the outer surface of the fiber. The diffusion of the lighter elements creates a non-light transmissive cladding that is of a refractive index that increases from the surface of the fiber towards its axis. The cladding longitudinally surrounds a light transmissive core and has a maximum refractive index that is less than any refractive index of the core. A single-mode, graded-index polymeric fiber is thereby created. By applying a reversible and controllable pressure to the exterior of the deformable fiber, the refractive index of the fiber can be changed accordingly. This change in refractive index permits one to continuously vary the time delay of a signal transmitted through a fixed length of the fiber.

OBJECTS OF THE INVENTION

It is an object of this invention to provide a continuously variable time delay.

A further object of this invention is to provide a continuously variable time delay in the form of a fixed length optical fiber.

Still a further object of the invention is to provide a continuously variable time delay in the form of a fixed length of optical fiber wherein the time delay is caused by the application of pressure upon the outside surface of the fiber.

Other objects, advantages, and new features of this invention will become apparent from the following detailed description of the invention when considered in conjunction with the accompanied drawing.

DESCRIPTION OF THE PREFERRED EMBODIMENT

Figure 1:
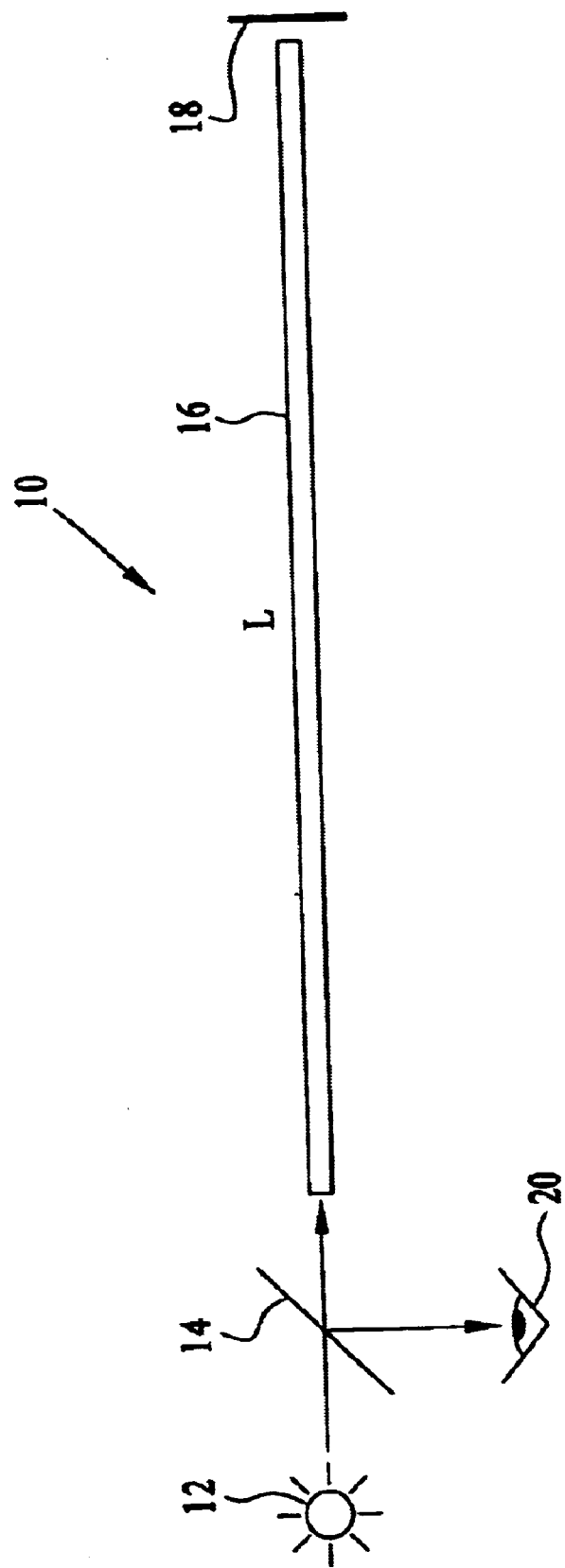
FIG. 1 is a schematic of a representative method and apparatus according to the invention.

FIG. 1 shows schematically a representative embodiment of the invention 10 as utilized in the form of a simple time delay line. In this configuration, an optical pulse 12 of very short duration is launched through a beam-splitter 14 coupled into a length L of optical fiber 16. The pulse transits the length L of the fiber and is reflected back by the end of the fiber or a mirror 18 and returns to the beam splitter where it is detected by means of an optical detector 20. The time delay is, therefore, twice the transit time of fiber length L. The medium is considered non-dispersive, i.e., does not suffer from waveguide or material dispersion; otherwise, one must consider the index of refraction is represented by the so-called group index, $$N_g = n_\lambda [1 - (\lambda/n_\lambda)(dn_\lambda/d\lambda)] \quad (1)$$

wherein $n_\lambda$ is the refractive index of the fiber at the wavelength $\lambda$ and $dn_\lambda/d\lambda$ is the dispersion of the fiber waveguide material contained in the fiber core.

We assume, therefore, that the index is represented more simply by its optical index, $n_\lambda$, and, therefore, the time delay $t_d$ is approximated as:

$$t_d = 2Ln\lambda/c \qquad (2)$$

where c is the speed of light in vacuum. The material system to be described herein may be dispersive, but the simpler analysis will be sufficient to describe the principles, construction, and operation of the continuously variable time delay system of the invention.

We begin by considering the polarization properties of a material medium and recall that the Clausius-Mosotti equation related the dielectric function of a compressible medium to its density, i.e.

$$(\epsilon-1)/\rho(\epsilon+2) \sim \text{constant} \qquad (3)$$

in which $\epsilon$ is the dielectric constant of the medium and $\rho$ is its density.

At very high frequencies, such as that of light in the visible or near infrared, the dielectric constant is approximately the square of the refractive index, that is, $$\epsilon = n^2 \qquad (4)$$

We may now rearrange equation (3) to read $$n^2 = (1+2\rho\kappa)/(1-\rho\kappa) \qquad (5)$$

in which $\kappa$ is a constant.

Now, recalling that the compressibility of a material is defined as the change in volume with pressure or, alternatively, the change in density with pressure, we may differentiate equation (5) to yield, $$dn/dP = (1.5/n)\kappa\rho\beta\tau[(1-\rho\kappa)^{-2}] \qquad (6)$$

where P is the pressure and $\beta\tau$ is the isothermal compressibility. We have thus derived a relation which shows that the change in refractive index is proportional to the isothermal compressibility and, therefore, if we select a transmission medium in which the compressibility is large, one can have large changes in the index of refraction. Hence, from equation (2) above, one can effect large changes in the time delay of an optical pulse.

In order for this concept to be applied practically, one must fabricate or use an optical fiber or optical waveguide which is reasonably compressible. A second condition is that the waveguide be single mode; otherwise, the pulse width would be degraded by the complexity of multiple modes, all of which would be arriving at the detector at different times due to modal dispersion.

It is known that fibers have been fabricated from silicone rubber. Silicone polymeric rubber is known to be highly compressible, but the fibers available commercially are multimodal with a very high numerical aperture or NA. This is so because the polymeric fibers rely on the air as the "cladding".

To achieve a smaller NA and single mode behavior, lighter elements can be diffused into the outer periphery of a polymeric fiber, thereby creating a cladding of lesser refractive index than the core of the fiber. A variety of elements of lighter density than the fiber, such as hydrogen, boron, carbon, or oxygen may be diffused into the outer surface of the fiber by enclosing the materials in a pressure chamber and forcing the lighter elements to diffuse into the outer regions of the fiber as a consequence of pressure and concentration gradients. Upon examining a cross-section of the fiber, its refractive index will, after diffusion, vary with distance x from the center or axis of the fiber and decrease towards the outer radius of the fiber. One may thereby create a single-mode, graded-index polymeric fiber with a small NA due to the smaller difference between the indices of the cladding and core regions.

An example of the delays that may be achieved can be estimated from actual material numbers.

Differentiating eq (2) with respect to pressure, we obtain $$d\Delta t/dP = (2L/c)dn/dP = (2L/c)1.5\rho\kappa\beta\tau/n(1-\rho\kappa)^2 \qquad (7)$$

and using a nominal index of 1.5 for the fiber material and 0.29 for the product $\rho\kappa$, we obtain a value of 38 nanoseconds per meter for materials with a compressibility of $\sim 1$ psi$^{-1}$ for a 10 psi change of pressure.

The invention has the capability of continuously changing the time delay an optical pulse will experience via the application of a predetermined and selectable pressure to the fiber optic line through which the pulse travels. In one implementation of the invention, one could enclose the length of fiber, wound appropriately on a spool, in a pressure chamber in which the internal pressure of the chamber may be changed such as by conventional hydraulic means. For example, one may have several fixed lengths, say 10, 100, 1000, or so meters of compressible fiber wound on different spools, but enclosed in the same pressure enclosure. Thus, a wide range of time delays may be obtained by selecting different spools to cover the selected time delay range. One thereby obtains a very broad range of continuously variable time delays for any purpose. The practical limit of this invention is attained where the length is such that the minimal detectable power is reached.

Obviously, many modifications and variations of the invention are possible in light of the above teaching. It is therefore to be understood that within the scope of the appended claims the invention may be practiced otherwise than as has been specifically described.

What is claimed is:

1. A method for converting a multimodal, high numerical aperture, polymeric fiber waveguide into a single-mode, low numerical aperture, polymeric fiber waveguide comprising the steps of:

providing a mulfimodal, high numerical aperture, polymeric fiber; and infusing an element into said polymeric fiber under pressure so that a non-light transmissive radially outerward cladding is created and a light transmissive radially inward core is created wherein said polymeric fiber after infusion has an index of refraction that increases from an outer surface thereof towards its axis for at least a portion of its radius and wherein said cladding has a maximum refractive index that is less than any refractive index of said core, said fiber, after infusion, having a lower numerical aperture than said fiber before infusion.

2. The method of claim 1 wherein said polymeric fiber is infused with an element selected from the group consisting of: hydrogen, boron, carbon and oxygen.

3. The method of claim 2 wherein said single-mode, low numerical aperture, polymeric fiber waveguide is a single mode optical waveguide.

4. The method of claim 3 wherein said polymeric fiber is silicone polymeric rubber.

* * * * *